United States Patent [19]

Saegusa et al.

[11] 4,250,300
[45] Feb. 10, 1981

[54] FLUORINE-CONTAINING POLYESTERS, AND THEIR PRODUCTION AND USE

[75] Inventors: Takeo Saegusa, Kyoto; Akira Yamada, Osaka; Masaaki Iwase, Takarazuka; Akitoshi Iwatani, Suita, all of Japan

[73] Assignee: Daikin Kogyo Co., Ltd., Osaka, Japan

[21] Appl. No.: 19,588

[22] Filed: Mar. 12, 1979

Related U.S. Application Data

[63] Continuation-in-part of Ser. No. 905,056, May 11, 1978, abandoned.

[30] Foreign Application Priority Data

May 12, 1977 [JP] Japan ................................. 52/55074

[51] Int. Cl.³ .............................................. C08G 73/24
[52] U.S. Cl. ..................................... 528/401; 528/191; 528/194; 528/297; 528/299; 528/302; 528/365
[58] Field of Search ............... 528/191, 194, 297, 299, 528/302, 401, 365

[56] References Cited

U.S. PATENT DOCUMENTS

| | | | |
|---|---|---|---|
| 3,438,946 | 4/1969 | Lichstein et al. .................... | 528/299 |
| 3,464,958 | 9/1969 | Matsuura et al. .................... | 528/365 |
| 3,505,411 | 4/1970 | Rice ................................. | 528/299 X |

*Primary Examiner*—Lucille M. Phynes
*Attorney, Agent, or Firm*—Stevens, Davis, Miller & Mosher

[57] ABSTRACT

A fluorine-containing polyester which comprises essentially as the constituting units (a) a group of the formula:

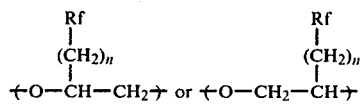

wherein Rf is a perfluoroalkyl group having 8 to 21 carbon atoms and n is an integer of 0 or 1 and (b) a group of the formula:

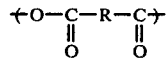

wherein R is one of the groups represented by the formulas:

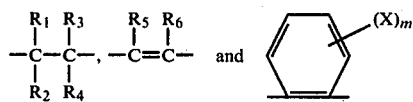

wherein $R_1$ to $R_6$ is each a hydrogen atom or a lower alkyl group, $R_1$ and $R_3$ being optionally combined together at the terminal carbon atoms to form a cyclic ring, X is a halogen atom or a lower alkyl group and m is an integer of 0 to 4, and is useful as a water and oil-repelling agent or a non-sticking agent.

21 Claims, No Drawings

FLUORINE-CONTAINING POLYESTERS, AND THEIR PRODUCTION AND USE

This is a continuation-in-part application of our co-pending application Ser. No. 905,056 filed May 11, 1978, now abandoned.

The present invention relates to novel fluorine-containing polyesters. More particularly, it relates to fluorine-containing polyesters having a perfluoroalkyl group as a side chain, and their production and use.

The fluorine-containing polyester of the invention comprises essentially as the constituting units (a) a group represented by the formula:

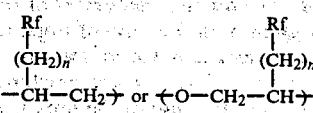

wherein Rf is a perfluoroalkyl group having 8 to 21 carbon atoms and n is an integer of 0 or 1 and (b) a group of the formula:

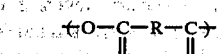

wherein R is one of the groups represented by the formulas:

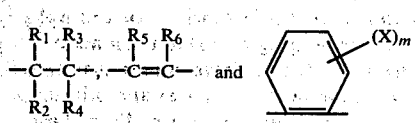

wherein $R_1$ to $R_6$ is each a hydrogen atom or a lower alkyl group, $R_1$ and $R_3$ being optionally combined together at the terminal carbon atoms to form a cyclic ring, particularly a 5 to 7-membered carbocyclic ring (including the two carbon atoms to which $R_1$ and $R_3$ are attached) bearing or not any additional ring condensed thereon, X is a halogen atom or a lower alkyl group and m is an integer of 0 to 4.

In the said polyester, the units of the group (a) and of the group (b) may be present in a molar proportion of 1-2:1, usually in a nearly equimolar proportion. When the units of the group (a) are present in a higher proportion than an equimolar amount to the units of the group (b), the polyester includes ether linkages or polyether moieties.

Further, in the polyester, a portion of the units (a) may be replaced by the unit of (c) a substituted oxyethylene group represented by the formula:

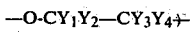

wherein $Y_1$ to $Y_4$ are each a hydrogen atom, a phenyl group or a lower alkyl group optionally substituted with a halogen atom, a lower alkoxy group or a phenoxy group.

The term "lower" as herein used in connection with alkyl or alkoxy is intended to mean a group having not more than 5 carbon atoms.

The fluorine-containing polyester of the invention has as a side chain a perfluoroalkyl group originating from the group (a) and is useful as a coating film forming material on surfaces of various substrates. The coating film thus formed possesses a low surface activity due to the perfluoroalkyl side chain and dhows, at the same time, an excellent adhesion to a substrate owing to the polyester linkages in the main chain. Thus, the polyester is advantageously utilizable as an oil and water-repelling agent and also as a non-sticking agent.

The fluorine-containing polyester of the invention may be prepared by treating under polymerization conditions (a') an epoxide represented by the formula:

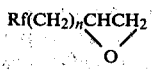

wherein Rf and n are each as defined above and (b') a cyclic acid anhydride represented by the formula:

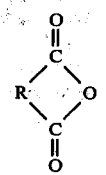

wherein R is as defined above. A portion of the epoxide (a') may be replaced by a substituted epoxide (c) represented by the formula:

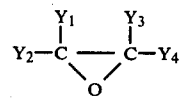

wherein $Y_1$ to $Y_4$ are each as defined above.

The reaction between the epoxide (a') and the cyclic acid anhydride (b') is a copolymerization with ring cleavage. When these starting monomers are used in a nearly equimolar proportion, the main product is an alternating copolymer wherein the groups originated from the epoxide (a') and from the cyclic acid anhydride (b') are bonded by an ester linkage. In the case that the epoxide (a') is used in a higher amount than an equimolar proportion to the cyclic acid anhydride (b'), excessive epoxides are linked by an ether bond to form a polyether moiety in the produced polyester. A similar reaction proceeds when a portion of the epoxide (a') is replaced by the substituted epoxide (c').

The use of the epoxide (a') and the cyclic acid anhydride (b') in a nearly equimolar ratio is the most preferred. If desired, the proportion may be varied up to make a molar ratio of the epoxide (a') and the cyclic acid anhydride (b') being 2:1. The proportion of the epoxide (a') and the cyclic acid anhydride (b') used as the starting monomers in the reaction is almost as such maintained in the produced polyester and nearly equal to the proportion of the group (a) and the group (b) in the polyester. Even when the cyclic acid anhydride (b') is used in an excessive amount to the epoxide (a'), the reaction proceeds smoothly but excess of the cyclic acid anhydride (b') remains as such without participating in the reaction. Thus, the use of the cyclic acid anhydride (b') in an excessive proportion is practically useless.

The epoxide (a') is generally known. For example, 2-perfluoroalkyl-1,2-epoxyethane (a': n=0) is described in German Offenlegungsschrift No. 2,160,783. Further, 3-perfluoroalkyl-1,2-epoxypropane (a': n=1) can be prepared by the reaction of 3-perfluoroalkyl-2-iodopropanol-1 with an alkali hydroxide according to the method described in Japanese Patent Publication No. 26286/1969. The perfluoroalkyl group contained in the epoxide (a′) has 8 to 21 carbon atoms, preferably 8 to 16 carbon atoms. The epoxide (a′) may be a single kind. A mixture of two or more kinds of epoxides (a′) may be also employed as the starting material.

The cyclic acid anhydride (b′) is a five membered cyclic compound obtained by dehydration from two carboxyl groups respectively linked to two carbon atoms being adjacent each other and linked to each other by a single bond or a double bond. Specific examples of such cyclic acid anhydride are succinic anhydride, maleic anhydride, phthalic anhydride, pyromellitic anhydride, 1,2-cyclohexanedicarboxylic anhydride, tetrahydrophthalic anhydride, 1,2,3,4-cyclopentanetetracarboxylic dianhydride, 1,2-cyclobutanedicarboxylic anhydride, 1,2-naphthalenedicarboxylic anhydride, 2,3-naphthalenedicarboxylic anhydride and their substituted derivatives. Thus, the cyclic acid anhydride (b′) may be any one of the following compounds:

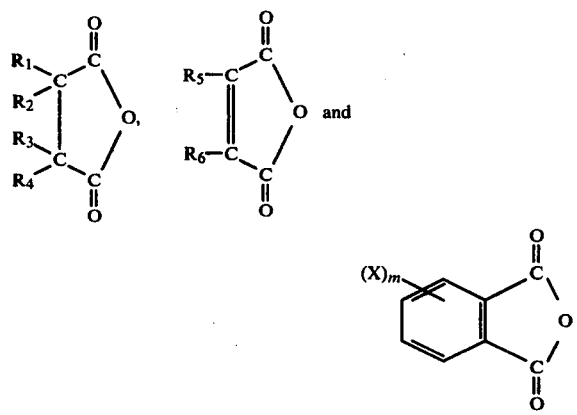

wherein $R_1$ to $R_6$, X and m are each as defined above. These may be used alone or in combination.

As the epoxy compound (c′), there may be exemplified ethylene oxide, propylene oxide, isobutylene oxide, butadiene oxide, styrene oxide, epihalogenohydrin (e.g. epichlorohydrin), alkyl or aryl glycidyl ether (e.g. methylglycidyl ether, phenylglycidyl ether), etc.

The fluorine-containing polyester of the invention can be prepared by treatment of a mixture of the monomers (a′) and (b′) or of (a′), (b′) and (c′) in the presence of a catalyst at an elevated temperature. As the catalyst, there may be used an alkali metal halide, an alkali metal hydroxide, an amine, an alkyl metal compound, a phosphine, etc. No limitation is present on the reaction temperature, and the most suitable temperature may be chosen depending on the reactivities of the monomers. While the use of a solvent is not necessarily required, its use is sometimes convenient for control of the reaction temperature. Examples of the solvent are N,N-dimethylformamide, acetonitrile, benzene, etc. Other inert solvents to the monomers may be also used.

In general, the fluorine-containing polyester of the invention is a thermoplastic substance with transparent appearance in which the said constituting units are contained in the main chain. The softening point is varied with the kind of the monomer(s) and is usually within a range of 60° to 120° C. It is soluble in acetone, ethyl acetate, chloroform, trifluorotrichloroethane or the like, but insoluble in water, ethanol, methanol, hexane, toluene or the like. The solvent-solubility is not influenced so greatly by the ratio of copolymerization of the monomers when the kinds of the monomers are not changed. But, it is varied in a relatively large range depending on the number of carbon atoms in the perfluoroalkyl group. With increase of the number of carbon atoms, the solubility is lowered. The fluorine-containing polyester of the invention in the form of solution or dispersion can be applied to a solid substrate so as to give to its surface an oil and water-repelling property and/or a non-sticking property. From this solution or dispersion, a self-supporting cast film can be prepared. This film is also oil and water-repelling and non-sticking.

The fluorine-containing polyester of the invention is utilizable as such or in the form of organic solvent solution or aqueous emulsion for various uses. It is particularly useful as an oil and water-repelling agent and a non-sticking agent because of the presence of a perfluoroalkyl group having a low surface energy as the side chain.

As oil and water-repelling agent is a substance which gives a property of repelling aqueous and oily substances to the surface of a solid substrate due to decreasing the critical surface tension of said surface. The aqueous substances include water and aqueous solutions of water soluble materials such as alcohols. The oily substances include mineral, animal and vegetable oils and fats such as kerosene, heavy oil, gasoline, liquid paraffin, pitch, asphalt, cotton oil, rape oil and whale oil. When applied to textile fabrics, for example, such oil and water-repelling agent exhibits an action of protection of the textile fabrics from contamination with aqueous stains such as inks and sauces and oily stains such as plant oils and mineral oils by repelling these contaminating materials. Further, for example, a paper or cloth treated with this oil and water-repelling agent is utilizable as a packing material for preventing permeation of asphalt or oils.

The non-sticking agent is a substance which prevents adhesion of adhesive materials to a substrate by decreasing the critical surface tension of the surface of said substrate. It comprises a releasing agent, a releasing sheet-processing agent, a backing agent, an anti-blocking agent, etc. The releasing agent is usually applied to a metal or wooden mold in a molding process for rubber, synthetic resin or the like by spraying or coating in order to assure good releasing. Sometimes, it is incorporated into a rubber or synthetic resin composition so as to impart thereto a self-releasing property. The backing agent is used, for instance, for backing a pressure sensitive adhesive tape to prevent its adhesion and facilitate its releasing. The releasing sheet processing agent is employed for production of a releasing sheet or paper to be used in a molding process of film, plate, etc. The anti-blocking agent is used as a treating agent for prevention of blocking between sheets, films, etc. retained in a closely contacted state for a long duration of time.

For practical use as the oil and water-repelling agent or the non-sticking agent, the polyester of the invention may be dissolved in an organic solvent (e.g. acetone, methyl ethyl ketone, ethyl acetate, dimethylformamide, methyl chloroform, trichloroethylene, trichlorotrifluoroethane, tetrachlorodifluoroethane) to make a solution. Alternatively, the polyester obtained by polymerization in a solvent may be diluted with such a solvent as mentioned above. The thus prepared solution or dilution may be incorporated with a jetting agent such as dichlorodifluoromethane, monofluorotrichloromethane or dimethyl ether and charged into an appropriate container to make an aerosol. Further, the polyester of the invention may be dispersed into an aqueous solvent together with various additives in the presence of a suitable surfactant as an emulsifier to make an aqueous emulsion. As the surfactant, any of anionic, nonionic and cationic ones is utilizable without particular limitation. In some cases, the polyester of the invention may be as such applied to a substrate by any suitable procedure.

For using the polyester of the invention as the oil the water-repelling agent or the non-sticking agent, the composition of the constituting units of the copolymer is not particularly limited, and a variety of compositions may be adopted. When the polyester contains both the units (a) and (c), the proportion of the unit (a) to the combination of the units (a) and (c) is required to be 5 mol % or more.

The oil and water-repelling agent containing the polyester of the invention can be applied to various substrates without particular limitation. For example, textile fabrics and paper are treatable with particular advantage. There may be also exemplified porous materials such as wood, leather, fur, felt, asbestos and brick, and materials having a smooth surface such as metal, tile, plastics and various coated surfaces. Textile fabrics comprise the ones made from natural fibers of animal and plant origins (e.g. cotton, flax, wool, silk), synthetic fibers (e.g. polyamide, polyester, polyvinyl acetal, polyacrylonitrile, polyvinyl chloride, polypropylene), hemi-synthetic fibers (e.g. rayon, acetate fiber), inorganic fibers (e.g. glass fiber, asbestos fiber) and their mixed fiber.

The non-sticking agent containing the copolymer of the invention as the active ingredient can be also applied to almost all of the substrates as mentioned above. The adhesive materials as the target of the non-sticking agent of the invention are natural or synthetic resins or rubbers such as polyurethane resin, epoxy resin, phenol resin, vinyl chloride resin, acryl resin, natural rubber, chloroprene rubber and fluorine-containing rubber. Industrially, the non-sticking agent is applicable, as a so-called "releasing agent", to a metal mold, a wooden mold, a plastic mold and a paper mold in molding of plastics and rubber, or utilizable for backing or adhesive tape made from paper, cellophane, cloth, plastic film or metal foil, or for preparation of a releasing paper.

The concentration of the polyester in the oil and water-repelling agent is not particularly limited. Usually, a concentration of 0.01 to 30% by weight, preferably 0.1 to 2.0% by weight, may be adopted. With a solution having too low a concentration, the oil and water-repelling property is not sufficient. Too high a concentration is disadvantageous from the economical viewpoint.

As to the concentration of the polyester in the non-sticking agent, a low concentration of 0.01% or less is usually sufficient when used as a releasing agent for the purpose of effecting releasing only once. In the case that the life of the agent is necessitated for a long duration of time after its application, a concentration of 0.05 to 30% by weight, preferably 0.1 to 10% by weight, may be required. For the use as the backing agent or the anti-blocking agent, almost the same concentration as above may be adopted. When the polyester is used by incorporating into a rubber or synthetic resin composition as an inner releasing agent, the concentration may be usually from 0.05 to 10% by weight, preferably from 0.1 to 3% by weight to the weight of the composition.

The procedure of application of the oil and water-repelling agent or the non-sticking agent containing the polyester of the invention as the active ingredient to a substrate may be appropriately selected depending on their preparation forms, the kind of the substrate, the purpose of the use of the substrate, etc. When, for example, formulated in a solution or an aqueous emulsion, it may be applied to the surface of the substrate by a conventional procedure such as spraying, immersion or coating, followed by drying, and if necessary, curing. An aerosol may be jetted to the substrate and then dried.

The oil and water-repelling agent of the invention may contain, in case of necessity, various additives such as an anti-static agent, a fire-proofing agent and a sizing agent. Further, film forming resins such as acryl resins and vinyl acetate resins or fine powders of silicon oxide and polytetrafluoroethylene may be incorporated therein. The non-sticking agent of the invention may contain, in case of necessity, film forming resins such as acryl resin and vinyl acetate resin, paints such as lacquer and vinyl chloride paint, fine powders of silicon oxide and polytetrafluoroethylene, oils such as silicone oil and fluorine oil, etc.

The present invention will be hereinafter explained further in detail by the following Examples wherein parts and % are by weight unless otherwise indicated.

The oil and water-repelling property in these examples is evaluated by the following criterion: the water-repelling property being indicated by the water-repellency number determined by the spray method according to AATCC (American Associations of Textile Chemists and Colorist) 22-1952; the oil-repelling property being indicated by the oil-repellency number determined by dropping a mixture of n-heptane and nujol in a varied mixing proportion (see Table 1) onto a specimen and observing whether the drop is kept or not for 3 minutes or more.

TABLE 1

| Oil-repellency No. | Composition of mixture | |
|---|---|---|
| | n-Heptane (% by volume) | Nujol (% by volume) |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100% nujol can not be kept. | |

The contact angle is determined by the aid of a microscope for determination of a contact angle, "Goniometer" manufactured by Elma Kogaku K.K.

The peeling test is carried out by the following procedure: an adhesive tape (specified in each Example) is sticked on the coated surface and pressed under a pressure of 5 kg/cm$^2$ at room temperature, and a load of 20 g/cm$^2$ is charged thereon at 20° C. and 70° C.; after 20 hours, the peeling strength at 180° is measured by the aid of a self-recording tensile tester.

EXAMPLE 1

In a flask equipped with a stirring apparatus and a reflux condenser,

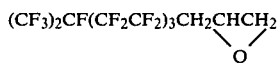

(hereinafter referred to as [I]) (32.0 g) (60 mmol), phthalic anhydride (9.0 g) (60 mmol) and N,N-dimethylbenzylamine (70 mg) (0.5 mmol) are charged in nitrogen atmosphere, and the contents are heated under stirring. When the reaction is carried out at 100° C. for about 1 hour, the reaction system becomes a homogeneous, light yellow mixture. After the reaction is effected for 5 hours, the contents are taken out and cooled to room temperature to obtain a light yellow solid. The thus obtained product is dissolved in acetone or ether and poured into n-hexane to precipitate white powders. The liquid phase is removed off by filtration, and the residue is washed with n-hexane and dried under reduced pressure to obtain white powders (40.5 g) (yield, approximately 100% to the sum of the starting materials). The softening point of this substance is 70° C.

In the infrared absorption spectrum of this substance, the following absorptions are observed: C=O in ester (1730 cm$^{-1}$); C-F (1150 to 1250 cm$^{-1}$ and 980 cm$^{-1}$); o-substituted phenyl (1070 cm$^{-1}$ and 740 cm$^{-1}$). An absorption characteristic to acid anhydride is not observed.

The elementary analysis of this substance is as follows: Found (%): C, 35.63; H, 1.35; F, 52.7. Calcd. (%): C, 35.63; H, 1.35; F, 53.5.

The said calculated values indicate the ones obtained by calculation on the assumption that the mol fraction of each of the following constituting units is 0.50:

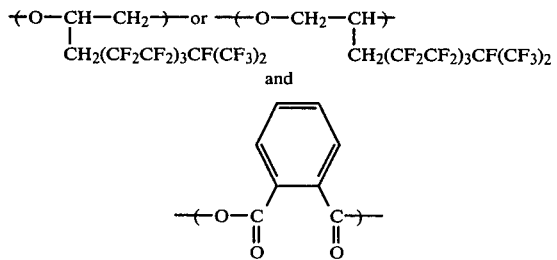

From the results, the substance is proved to be a polyester copolymer having the said constituting units formed by ring cleavage of the starting materials in a molar ratio of 1:1.

EXAMPLE 2

A mixture of

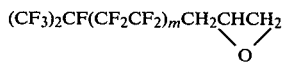

(hereinafter referred to as [II]) (composition: m=3, 55 mol %; m=4, 28 mol %; m=5, 11 mol %; m=6, 4 mol %; m=7, 1 mol %) (40.7 g, 70 mmol), epichlorohydrin (3.1 g, 33 mmol), phthalic anhydride (15.2 g, 103 mmol) and N,N-dimethylbenzylamine (50 mg, 0.3 mmol) is subjected to reaction as in Example 1 to obtain a yellowish brown solution (57.5 g). In the infrared absorption spectrum of this product, the following absorptions are observed: C=O in ester (1730 cm$^{-1}$); C-F (1150 to 1250 cm$^{-1}$ and 980 cm$^{-1}$); o-substituted phenyl (1070 cm$^{-1}$ and 740 cm$^{-1}$); C-Cl (720 cm$^{-1}$). An absorption characteristic to acid anhydride is not observed. The softening point of this product is 62° C. Taking in consideration these results and also the result of the elementary analysis, the product is proved to be a polyester copolymer in which the constituting units formed by ring cleavage of the starting materials are present in a proportion approximately equal to that of the amounts of the used starting materials.

EXAMPLE 3

The compound [I] used in Example 1 (9.19 g) (17.5 mmol), succinic anhydride (0.82 g) (8 mmol) and N,N-dimethylbenzylamine (12 mg) (0.08 mmol) are dissolved in a mixture of N,N-dimethylformamide (15 ml) and benzene (5 ml). The resultant solution is charged into a glass ampoule in which the atmosphere is replaced by nitrogen and heated at 100° C. for 60 hours. The reaction system becomes a black brown viscous liquid, which is poured into water or methanol to obtain a black brown grease-like polymer (6.18 g). In the infrared absorption spectrum of this product, the following absorptions are observed: C=O (1740 cm$^{-1}$); C-F (1150 to 1250 cm$^{-1}$ and 980 cm$^{-1}$). The softening point of the polyester is 45° C. Its composition is calculated from the values of the elementary analysis as follows: the constituting unit of [I], 60%; the constituting unit of succinic anhydride, 40%. Elementary analysis: Calcd. (%): C, 29.71; H, 1.30; F, 60.9. Found (%): C, 29.13; H, 1.52; F, 60.0.

From the above results, the product is proved to be a polyester copolymer containing the compound [I] and succinic anhydride as the starting materials in a proportion of 6:4.

EXAMPLE 4

The reaction of the compound [II] used in Example 2 (29.2 g) (50 mmol), phthalic anhydride (5.2 g) (35 mmol), tetrachlorophthalic anhydride (4.3 g) (15 mmol) and N,N-dimethylbenzylamine (500 mg) (3 mmol) is carried out in the same manner as in Example 1 to obtain a brown solid (37.5 g). In the infrared absorption spectrum of this product, the following absorptions are observed: C=O in ester (1730 cm$^{-1}$); C-F (1150 to 1250 cm$^{-1}$ and 980 cm$^{-1}$); o-substituted phenyl (1070 cm$^{-1}$ and 740 cm$^{-1}$); C-Cl (720 cm$^{-1}$). The softening point is 78° C. By the elementary analysis, it is shown that the product contains the units of the starting materials in a proportion approximately equal to that of their starting amounts. Thus, the product is proved to be a polyester copolymer.

EXAMPLE 5

In a 100 ml volume flask equipped with a reflux condenser and a stirring apparatus, the compound [II] used in Example 2 (52.0 g) (89 mmol), phthalic anhydride (9.2 g) (62 mmol) and N,N-dimethylbenzylamine (50 mg) (0.3 mmol) are charged, and the contents are heated at 120° C. for 1.5 hours. Then, tetrachlorophthalic anhydride (7.7 g) (27 mmol) is added thereto, and the reaction is continued for further 3 hours. After completion of the reaction, the contents are taken out and cooled to room temperature to obtain a brown solid (67.6 g). The softening point of this product is 62° C.

From the results of the analyses, the product is proved to be a polyester copolymer containing the units of the starting materials in a proportion approximately equal to that of their starting amounts.

EXAMPLES 6 to 17

The polymerization of the monomers shown in Table 2 is effected in the same manner as in Example 1 (in the absence of a solvent; Examples 6, 7, 9, 10 and 12) or as in Example 3 (in the presence of a solvent shown in Table 2; Examples 8 and 11). The reaction conditions, the results of reaction and the properties of the product are shown in Table 2. The epoxides [I] and [II] in the column of the monomers of Table 2 correspond to the fluorine-containing epoxides used in Examples 1 and 2, respectively.

EXAMPLE 18

The polyester prepared in Example 1 (0.5 part) is dissolved in tetrachlorodifluoroethane (99.5 parts). Into the thus obtained solution, polyester Amundsen cloth is immersed, then nipped by a mangle 100% by weight wet pick up and dried at 100° C. for 3 minutes.

The water-repelling property of the thus treated cloth is 90 and the oil-repelling property is 110. In case of polyester Amunzen cloth not treated with the polyester, both the water-repelling property and the oil-repelling property are 0.

EXAMPLE 19

The polyester prepared in Example 2 (0.5 part) is dissolved in a mixture of methylchloroform (67 parts)

TABLE 2

| Example No. | Monomer Kinds | Amount used (g) | Catalyst (Amount used) | Solvent (Amount used) | Temperature (°C.) | Time (hr) | Yield (g) | Appearance | Softening point (°C.) |
|---|---|---|---|---|---|---|---|---|---|
| 6 | Epoxide [I] | 12.6 | Lithium chloride (16 mg) | — | 80 | 12 | 14.9 | Yellow powder | 35 |
|  | Maleic anhydride | 2.35 |  |  |  |  |  |  |  |
| 7 | Epoxide [I] | 42.5 | Lithium chloride (75 mg) | — | 130 | 6 | 52.0 | White powder | 102 |
|  | Phthalic anhydride | 5.4 |  |  |  |  |  |  |  |
|  | Pyromellitic anhydride | 4.7 |  |  |  |  |  |  |  |
| 8 | Epoxide [I] | 1.79 | N,N-Dimethylbenzylamine (10 mg) | N,N-Dimethylformamide (4 ml) Toluene (2 ml) | 110 | 24 | 1.64 | White powder | 60 |
|  | Phthalic anhydride | 0.36 |  |  |  |  |  |  |  |
|  | Pyromellitic anhydride | 0.16 |  |  |  |  |  |  |  |
| 9 | Epoxide [II] | 37.6 | N,N-Dimethylbenzylamine (50 mg) | — | 100 | 5 | 54.2 | Brown powder | 55 |
|  | Phenylglycidyl ether | 4.3 |  |  |  |  |  |  |  |
|  | Phthalic anhydride | 13.6 |  |  |  |  |  |  |  |
| 10 | Epoxide [II] | 51.5 | N,N-Dimethylbenzylamine (70 mg) | — | 120 | 5 | 91.0 | Brown powder | 65 |
|  | Phenylglycidyl ether | 10.4 |  |  |  |  |  |  |  |
|  | Phthalic anhydride | 16.3 |  |  |  |  |  |  |  |
|  | Tetrachlorophthalic anhydride | 13.5 |  |  |  |  |  |  |  |
| 11 | Epoxide [I] | 2.02 | N,N-Dimethylbenzylamine (6 mg) | N,N-Dimethylformamide (2 ml) Benzene (1 ml) | 120 | 24 | 1.51 | Black powder | 52 |
|  | Succinic anhydride | 0.20 |  |  |  |  |  |  |  |
|  | Maleic anhydride | 0.19 |  |  |  |  |  |  |  |
| 12 | Epoxide [II] | 6.4 | N,N-Dimethylbenzylamine (40 mg) | — | 120 | 5 | 36.8 | Pale yellow powder | 62 |
|  | Phenylglycidyl ether | 14.8 |  |  |  |  |  |  |  |
|  | Phthalic anhydride | 16.3 |  |  |  |  |  |  |  |
| 13 | Epoxide [II] | 40.0 | N,N-Dimethylbenzylamine (50 mg) | — | 130 | 7 | 44.2 | Brown powder | 48 |
|  | Succinic anhydride | 3.85 |  |  |  |  |  |  |  |
|  | Phthalic anhydride | 2.39 |  |  |  |  |  |  |  |
| 14 | Epoxide [II] | 30.8 | N,N-Dimethylbenzylamine (50 mg) | — | 120 | 6 | 40.5 | Brown powder | 38 |
|  | Styrene oxide | 2.95 |  |  |  |  |  |  |  |
|  | 2,3-Dimethyl-2,3-epoxybutane | 0.11 |  |  |  |  |  |  |  |
|  | Succinic anhydride | 7.81 |  |  |  |  |  |  |  |
| 15 | Epoxide [II] | 12.4 | N,N-Dimethylbenzylamine (20 mg) | — | 130 | 6 | 17.5 | Brown powder | 43 |
|  | 1,2-Butylene oxide | 0.25 |  |  |  |  |  |  |  |
|  | n-Hexadecylsuccinic anhydride | 4.8 |  |  |  |  |  |  |  |
|  | 1,2-Cyclohexanedicarboxylic anhydride | 0.93 |  |  |  |  |  |  |  |
| 16 | 1,2-Epoxy-3-(perfluoro-n-octyl)propane | 3.04 | N,N-Dimethylbenzylamine (9 mg) | N,N-dimethylformamide (3 ml) Toluene (1.5 ml) | 110 | 24 | 1.72 | Black powder | 50 |
|  | Succinic anhydride | 0.32 |  |  |  |  |  |  |  |
|  | Maleic anhydride | 0.31 |  |  |  |  |  |  |  |
| 17 | 1,2-Epoxy-3-(perfluoro-n-octyl)propane | 60.0 | N,N-Dimethylbenzylamine (50 mg) | — | 100 | 6 | 94.2 | Pale yellow powder | 48 |
|  | Phenylglycidyl ether | 8.6 |  |  |  |  |  |  |  |
|  | Phthalic anhydride | 27.1 |  |  |  |  |  |  |  | and butyl acetate (2.5 parts). The thus obtained solution is charged into a can, and dichlorodifluoromethane (30 parts) is added thereto to make an aerosol of the copolymer.

The aerosol is sprayed onto polyester-cotton (65:35) mixed spun broadcloth to moisten the whole cloth lightly. After allowed to stand at room temperature for 30 minutes, the cloth is subjected to determination of the water-repelling property and the oil-repelling property, which are respectively 90 and 100. In case of polyester-cotton mixed spun cloth not treated with the aerosol, both the water-repelling property and the oil-repelling property are 0.

EXAMPLE 20

Each of the polyesters prepared in Examples 3 to 12 is dissolved in a solvent shown in Table 3 to make a solid concentration of 0.5%. Using the thus obtained solution, polyester Amunzen cloth is treated in the same manner as in Example 18, and the water-repelling property and the oil-repelling property of the treated cloth are measured. The results are shown in Table 3.

TABLE 3

| Polymer | Solvent (% in case of mixture) | Water-repelling property | Oil-repelling property |
|---|---|---|---|
| Ex. 3 | N,N-Dimethylformamide | 100 | 110 |
| Ex. 4 | Methylchloroform (90) Ethyl acetate (10) | 90 | 100 |
| Ex. 5 | Methylchloroform (90) Ethyl acetate (10) | 90 | 100 |
| Ex. 6 | Trichlorotrifluoroethane | 90 | 100 |
| Ex. 7 | Trichlorotrifluoroethane (50) Acetone (50) | 100 | 110 |
| Ex. 8 | Trichlorotrifluoroethane (50) Acetone (50) | 100 | 110 |
| Ex. 9 | Methylchloroform | 90 | 100 |
| Ex. 10 | Methylchloroform | 100 | 100 |
| Ex. 11 | Dichloromethane | 90 | 100 |
| Ex. 12 | Methylchloroform | 80 | 80 |
| Ex. 16 | Dichloromethane | 90 | 100 |
| Ex. 17 | Methylchloroform | 80 | 80 |

EXAMPLE 21

The polyester prepared in Example 1 (10 parts) is dissolved in methyl isobutyl ketone (15 parts), and "Nonion ST-221" (nonionic surfactant manufactured by Nippon Oil and Fats Co., Ltd.) (0.6 part) and water (74.4 parts) are added thereto. The mixture is stirred under high speed for 30 minutes by the aid of a homomixer to prepare a milky white aqueous emulsion, which remains in a stably emulsified state even after allowed to stand still at room temperature for 3 months.

The aqueous emulsion (3 parts) is diluted with water (97 parts), and nylon taffeta cloth is immersed therein. Then, the cloth is nipped by the aid of a mangle 40% by weight wet pic up, dried at 80° C. for 2 minutes and further treated at 150° C. for 2 minutes. The water-repelling property and the oil-repelling property of the thus treated cloth are 90 and 100, respectively. In case of nylon taffeta cloth not treated with the aqueous emulsion of the copolymer, the water-repelling property and the oil-repelling property are both 0.

EXAMPLE 22

A treating solution is prepared by admixing the aqueous emulsion of the polyester obtained in Example 21 (5 parts), "Sumitex Resin NS-1" (glyoxal resin manufactured by Sumitomo Chemical Co., Ltd.) (10 parts), "Sumitex Accelerator X-80" (metal salt catalyst manufactured by Sumitomo Chemical Co., Ltd.) (3 parts) and water (82 parts).

Into the thus obtained treating solution, polyester cotton (50:50) mixed spun twill cloth is immersed and then nipped by the aid of a mangle 80% by weight wet pick up. After dried at 80° C. for 3 minutes, the cloth is further treated at 150° C. for 2 minutes. The water-repelling property and the oil-repelling property of the thus treated cloth are both 100. In case of untreated polyester-cotton mixed spun cloth, the water-repelling property and the oil-repelling property are both 0.

EXAMPLE 23

To each of a glass plate, an aluminum plate and a polyester film, each having a cleaned surface, a 1% trichlorotrifluoroethane solution of the polyester prepared in Example 3 is applied by the aid of a drawing brush. After allowing to stand for 1 hour, the contact angle of water and n-hexadecane is determined. For comparison, a glass plate, an aluminum plate and a polyester film not coated with the polymer solution are subjected to determination of the contact angle. The results are shown in Table 4, from which it is apparent that excellent water-repelling property and oil-repelling property are given to the surface of each substrate by the treatment with the copolymer.

TABLE 4

| Substrate | Contact angle of surface coated with polymer solution | | Contact angle of surface coated with polymer solution | |
|---|---|---|---|---|
| | Water | n-Hexadecane | Water | n-Hexadecane |
| Glass plate | 115° | 73° | 10° | less than 10° |
| Aluminum plate | 113° | 72° | 15° | less than 10° |
| Polyester film | 114° | 72° | 38° | less than 10° |

EXAMPLE 24

The polyester prepared in Example 13 (1 part) is dissolved in a mixture of trichlorotrifluoroethane (90 parts) and acetone (9 parts). The obtained solution is applied by the aid of a brush to a steel mold for molding of disc having a concave portion of 40 mm in diameter and 2 mm in depth and then dried in the air. For comparison, each of commercially available releasing agents A (silicone) and B (fatty wax) is diluted with toluene to make a 1% concentration and applied to another substrate by the aid of a brush. A mixture of "Epicoat No. 828" (thermosetting epoxy resin manufactured by Shell Oil Co., Ltd.) (100 parts) and triethylenetetramine (10 parts) is poured into the said mold, and a pin is sticked into the central portion in order to facilitate taking-out of the molded product after hardening. After allowed to stand at room temperature for 2 hours, the mixture is heated at 100° C. for 1 hour for hardening. Then, the pin is pulled to take out the molded product (disc) from the mold. The releasing property is estimated from the hand feeling at the taking-out according to the following criteria:

| Value | Taking-out condition |
|---|---|
| 5 | The molded product can be taken out from the mold even with little power. |
| 4 | It can be taken out with slight power. |

-continued

| Value | Taking-out condition |
|---|---|
| 3 | It can be taken out with somewhat strong power. |
| 2 | It can be taken out with difficulty even with strong power. |
| 1 | It can not be taken out even with strong power because it adheres to the mold. |

The releasing life is determined by applying the releasing agent once and then repeating the molding without further application, until the releasing is deteriorated. Namely, in case of the value being 3 or higher according to the above criteria, the molding is repeated without application, and the number obtained by substracting 1 from the number of times of the molding at which the value indicates 2 or lower is recorded as the releasing life. The releasing property is abruptly lowered at the point close to the releasing life. Until this point, an approximately equal releasing property is shown. The value of the releasing property shown in Table 5 is the one as seen most frequently in such determination.

TABLE 5

| Releasing agent | Releasing property | Releasing life (times) |
|---|---|---|
| Production of invention | 5 | 6 |
| Commercially available product A | 1 | 0 |
| Commercially available product B | 1 | 0 |

EXAMPLE 25

The polyester prepared in Example 1 (0.2 part) and "Epicoat No. 828" (epoxy resin manufactured by Shell Oil Co., Ltd.) (100 parts) are admixed well, and triethylenetetramine (10 parts) is added thereto. The resultant mixture is poured into the same steel mold as used in Example 24 which has been previously cleaned, any releasing agent being not applied thereto.

Using this mold, the resin is hardened as in Example 24, and the releasing property is estimated according to the same criteria. The molded product can be taken out from the mold with great ease, the value being 5. The molded product is transparent and shows the same appearance as that of the molded product obtained in Example 24 by molding the resin not incorporated with the polyester in the mold coated with the polyester solution. The contact angle of the molded product of this Example is 108° in case of water and 69° in case of n-hexadecane.

EXAMPLE 26

The polyester prepared in Example 3 (0.7 part) is dissolved in a mixture of trichlorotrifluoroethane (40 parts) and acetone (9.3 parts). The resultant solution is charged into an aerosol can, and dichlorodifluoromethane (50 parts) is added thereto to prepare an aerosol.

The aerosol is sprayed to a steel mold (for molding of four plates of 10 cm in length, 2 cm in width and 0.2 cm in thickness) of an automatic injection molding machine, and injection molding of polystyrene resin "HF-55" (manufactured by Mitsubishi Monsant Co., Ltd.) is carried out under the conditions: injection temperature, 190° C.; temperature of mold, 45° C.; retention time in mold, 25 seconds. The injection molding can be effected 20 times or more continuously. For comparison, the same procedure is repeated using a commercially available product C (aerosol of wax type releasing agent); but releasing becomes impossible when the molding is carried out 8 times continuously.

EXAMPLE 27

The polyester prepared in Example 1 (2 parts) is dissolved in ethyl acetate (98 parts), and the resultant solution is applied to the surface of cellophane by the aid of a bar coater No. 8 and dried at 100° C. for 2 minutes. The non-sticking property of the cellophane thus coated is determined by the peeling test using a pressure sensitive adhesive tape (width, 18 mm; manufactured by Nichiban Company, Limited). For comparison, the non-sticking property of cellophane not coated with the polyester is also determined by the same method. The results are shown in Table 6. It is apparent that the cellophane coated with the polyester shows an excellent peeling property.

TABLE 6

| | 180°-Peeling strength after loading for 20 hours | |
|---|---|---|
| | Temperature (°C.) | (g/cm) |
| Cellophane coated with polyester of Example 1 | 20 | 16 |
| | 70 | 18 |
| Cellophane not coated with polyester of Example 1 | 20 | 120 |
| | 70 | 140 |

EXAMPLE 28

Each of the polyesters prepared in Examples 7 to 12, 16 and 17 is dissolved in a solvent shown in Table 7 to make a solid concentration of 2%. The resultant solution is applied to a polyester film by the aid of a bar coater No. 8 and dried. The non-sticking property of the polyester film thus coated with the polyester is determined by the peeling test by the use of a polyester tape having a width of 12 mm (manufactured by Nitto Denko Co., Ltd.). The results are shown in Table 7.

TABLE 7

| | | 180°-Peeling strength (g/cm) | |
|---|---|---|---|
| | Solvent (% in case of mixture) | After loading for 20 hours at 20° C. | After loading for 20 hours at 70° C. |
| Example 7 | Trichlorotrifluoroethane (50) Ethyl acetate (50) | 22 | 22 |
| Example 8 | Trichlorotrifluoroethane (50) Ethyl acetate (50) | 25 | 27 |
| Example 9 | Ethyl acetate | 60 | 65 |
| Example 10 | Ethyl acetate (50) Methylchloroform (50) | 52 | 60 |
| Example 11 | Ethyl acetate | 35 | 37 |
| Example 12 | Ethyl acetate | 210 | 230 |
| Example 16 | Ethyl acetate | 38 | 39 |
| Example 17 | Ethyl acetate | 220 | 225 |
| Untreated | — | 405 | 420 |

EXAMPLE 29

The polyester prepared in Example 8 (2 parts) is dissolved in ethyl acetate (98 parts). On the surface of a kraft paper of 120 g/m² in weight, a 10% aqueous solution of polyvinyl alcohol (polymerization degree, 1750; saponification degree, 98.5) is applied by the aid of a bar coater No. 12 and dried. To the coated surface, the above obtained polymer solution is applied by the aid of a bar coater No. 8 and dried. To each of the thus treated kraft paper and an untreated kraft paper coated with polyvinyl alcohol alone, vinyl chloride plastisol ("ME-120" manufactured by Denkikagaku Kogyo K.K.) is applied to make a thickness of 300 microns and dried at 200° C. for 5 minutes for gelation. Then, the peeling resistance of the vinyl chloride film is determined by the aid of a self-recording tensile tester ("Tensilon" manufactured by Toyo Sokki K.K.). Further, the repeated usability is also tested.

It is confirmed from the results of these tests that the peeling resistance of the kraft paper coated with the polyester is 10 g/cm and the same value is maintained even after repeated use in 10 times, while the peeling resistance of the kraft paper not coated with the polyester is 22 g/cm and peeling of the film is impossible at the second use.

EXAMPLE 30

"Phthalkyd 240-60" (alkyl resin manufactured by Hitachi Chemical Co., Ltd.) (40 parts), "Melan 14" (melamine resin manufactured by Hitachi Chemical Co., Ltd.) (40 parts), n-butanol (3 parts) and a 10% butyl acetate solution of the polyester prepared in Example 2 (5 parts) are admixed, and a 20% ethanol solution of hydrochloric acid (9 parts) is added thereto to prepare a coating paint. The paint is applied, as finish coating, to a plywood board by the aid of a bar coater No. 8 and dried.

For comparison, a coating paint is prepared from the same components as above but replacing the solution of the polyester of Example 2 by butyl acetate (5 parts). This paint is applied to a plywood board in the same manner as above.

On the thus treated plywood board, a pressure sensitive adhesive tape having a width of 18 mm is sticked under pressure by a finger, and then the tape is peeled off vigorously. When the operation is repeated, the surface is peeled off at the first time of operation in case of the plywood board coated with the paint not containing the polyester solution. To the contrary, any change is not seen in the surface state, even after repeated operations in 10 times, in case of the plywood board coated with the paint containing the polyester solution.

What is claimed is:

1. A fluorine-containing polyester which comprises as the constituting units (a) a group of the formula:

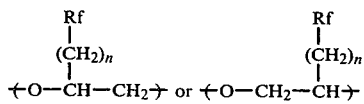

wherein Rf is a perfluoroalkyl group having 8 to 21 carbon atoms and n is an integer of 0 or 1 and (b) a group of the formula:

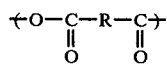

wherein R is one of the groups represented by the formulas:

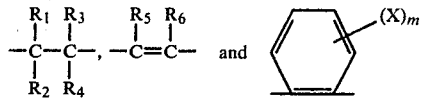 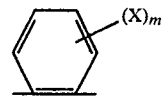

wherein $R_1$ to $R_6$ is each a hydrogen atom or a lower alkyl group, $R_1$ and $R_3$ being optionally combined together at the terminal carbon atoms to form a cyclic ring, X is a halogen atom or a lower alkyl group and m is an integer of 0 to 4.

2. The fluorine-containing polyester according to claim 1, wherein R is a group of the formula:

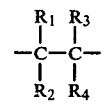

wherein $R_1$ to $R_4$ is each a hydrogen atom or a lower alkyl group, $R_1$ and $R_3$ being optionally combined together at the terminal carbon atoms to form a cyclic ring.

3. The fluorine-containing polyester according to claim 1, wherein R is a group of the formula:

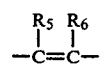

wherein $R_5$ and $R_6$ are each a hydrogen atom or a lower alkyl group.

4. The fluorine-containing polyester according to claim 1, wherein R is a group of the formula:

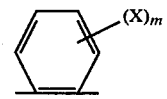

wherein X is a halogen atom or a lower alkyl group and m is an integer of 0 to 4.

5. The fluorine-containing polyester according to claim 1, wherein the molar proportion of the groups (a) and (b) is 1-2:1.

6. The fluorine-containing polyester according to claim 5, wherein the molar proportion of the groups (a) and (b) is almost 1:1.

7. The fluorine-containing polyester according to claim 1, which further comprises (c) a substituted oxyethylene group of the formula,

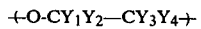

wherein $Y_1$ to $Y_4$ are each a hydrogen atom, a phenyl group or an alkyl group optionally substituted with a halogen atom, a lower alkoxy group or a phenoxy group.

8. The fluorine-containing polyester according to claim 7, wherein the amount of the group (c) is less than 95 mole % on the basis of the combination of the groups (a) and (c).

9. The fluorine-containing polyester according to claim 8, wherein the molar proportion of the groups (a)+(c) and (b) is 1-2:1.

10. The fluorine-containing polyester according to claim 9, wherein the molar proportion of the groups (a)+(c) and (b) is almost 1:1.

11. A process for preparing the fluorine-containing polyester according to claim 1, which comprises subjecting a mixture comprising (a') an epoxide of the formula:

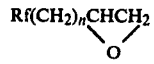

wherein Rf and n are each as defined in claim 1 and (b') a cyclic acid anhydride of the formula:

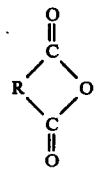

wherein R is as defined in claim 1 to polymerization.

12. The process according to claim 11, wherein the molar proportion of the monomers (a') and (b') is 1–2:1.

13. The process according to claim 12, wherein the molar proportion of the monomers (a') and (b') is almost 1:1.

14. A process for preparing the fluorine-containing polyester according to claim 7, which comprises subjecting a mixture comprising (a') an epoxide of the formula:

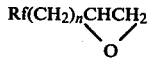

wherein Rf and n are each as defined in claim 1, (b') a cyclic acid anhydride of the formula:

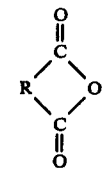

wherein R is as defined in claim 1 and (c') a substituted epoxide of the formula:

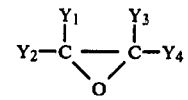

wherein $Y_1$ to $Y_4$ are each as defined in claim 7 to polymerization.

15. The process according to claim 14, wherein the amount of the monomer (c') is less than 95 mol % on the basis of the combination of the monomers (a') and (c').

16. The process according to claim 15, wherein the molar proportion of the monomers (a') and (b') is 1–2:2.

17. The process according to claim 16, wherein the molar proportion of the monomers (a')+(b') and (b') is almost 1:1.

18. A water and oil-repelling agent comprising as the essential component the fluorine-containing polyester according to claim 1.

19. A water and oil-repelling agent comprising as the essential component the fluorine-containing polyester according to claim 7.

20. A non-sticking agent comprising as the essential component the fluorine-containing polyester according to claim 1.

21. A non-sticking agent comprising as the essential component the fluorine-containing polyester according to claim 7.

* * * * *